United States Patent [19]

Goodfellow

[11] Patent Number: 4,510,002
[45] Date of Patent: Apr. 9, 1985

[54] MANUFACTURE OF PNEUMATIC TIRES

[75] Inventor: Anthony G. Goodfellow, Maghull, England

[73] Assignee: W & A Bates Limited, London, England

[21] Appl. No.: 543,874

[22] Filed: Oct. 20, 1983

[30] Foreign Application Priority Data

Nov. 2, 1982 [GB] United Kingdom ............... 8231308

[51] Int. Cl.³ ..................... B29H 17/22; B29H 17/16
[52] U.S. Cl. .................................. 156/126; 156/130.7; 156/132; 156/133; 156/400; 156/401; 156/403; 156/416; 264/326
[58] Field of Search ................. 156/126, 127, 130.7, 156/132, 133, 134, 135, 110.1, 123, 398, 400, 401, 402, 416, 417, 419; 264/315, 326, 501; 152/330 R, 354 R, 361 R

[56] References Cited

U.S. PATENT DOCUMENTS

| 3,414,446 | 12/1968 | Pearce et al. | 156/130.7 |
| 3,785,905 | 1/1974 | Badenkov et al. | 156/132 X |
| 4,007,080 | 2/1977 | Klöpper | 156/126 X |
| 4,128,450 | 12/1978 | Cantarutti | 156/126 X |
| 4,226,656 | 10/1980 | Appleby et al. | 156/132 |
| 4,416,720 | 11/1983 | Baldoni | 156/132 X |

FOREIGN PATENT DOCUMENTS

| 1402431 | 8/1975 | United Kingdom . |
| 494282 | 12/1975 | U.S.S.R. . |
| 579167 | 11/1977 | U.S.S.R. . |
| 763145 | 9/1980 | U.S.S.R. . |

Primary Examiner—William A. Powell
Assistant Examiner—Thomas Bokan
Attorney, Agent, or Firm—Stevens, Davis, Miller & Mosher

[57] ABSTRACT

A method and apparatus for use in the manufacture of pneumatic tires, in which a pair of tire bead assemblies are held in accurately spaced relationship against opposite ends of a tube. Tire carcass material carried on an expansible former is located within the tube and expanded to engage the bead assemblies, projecting ends of the carcass material being turned radially outwardly around the bead assemblies while the bead assemblies are supported by the tube.

12 Claims, 14 Drawing Figures

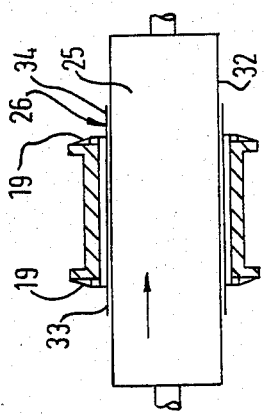
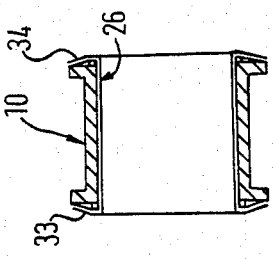
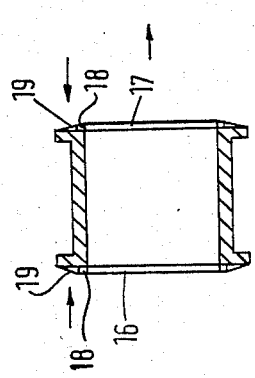
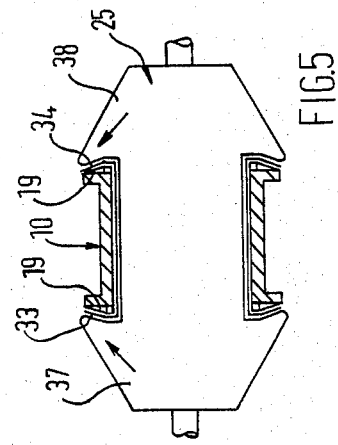
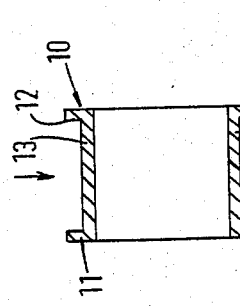
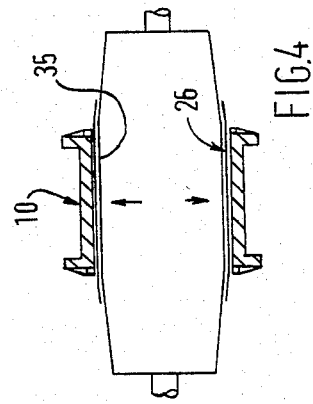

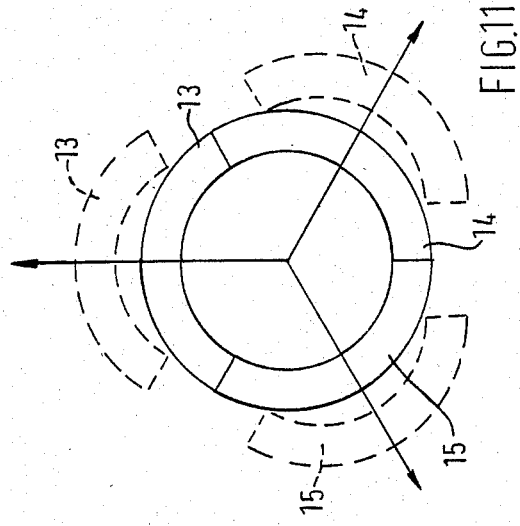
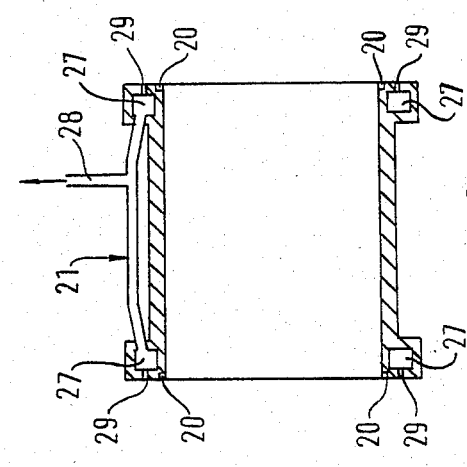
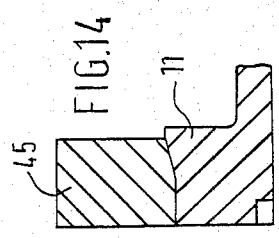
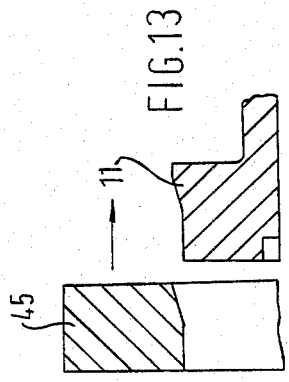
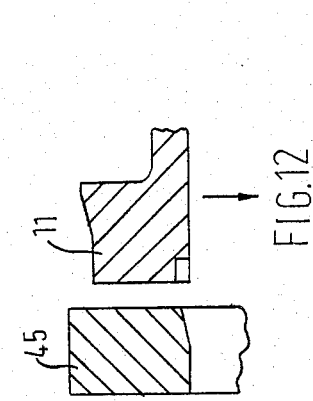

MANUFACTURE OF PNEUMATIC TIRES

This invention relates to the manufacture of pneumatic tyres.

In the manufacture of radial tyres, i.e. tyres in which the carcass cords extend in generally axial planes from bead wire to bead wire and the tread region of the tyre is reinforced by a relatively inextensible rigid breaker layer, the conventional methods of construction normally commence with the building of a tyre carcass in cylindrical form, applying the bead wires, and shaping the carcass to toroidal form before applying the breaker and tread.

It has been found that the behaviour of a pneumatic tyre is affected greatly by the accuracy of placement of the bead wires within the carcass, and that small variations and inaccuracies in this respect can cause large unbalanced radial forces to be generated during running of the tyre.

One object of the present invention is to provide an improved method and apparatus for the manufacture of a pneumatic tyre, in which improved accuracy in the location of the bead wires is achieved.

According to one aspect of the invention a method of manufacturing a partially-built carcass for a pneumatic tyre comprises locating a pair of tyre bead elements coaxially at opposite ends of a bead tube in axially spaced relationship predetermined by the length of the tube, locating within the tube an expansible former around which tyre carcass material is wrapped so that the material extends axially within the tube and the bead elements and projects axially beyond the bead element at each end, expanding the carcass material to engage the bead elements and turning the projecting ends of the material radially outwardly around the bead elements whilst the bead elements are supported by the tube.

The expression "bead tube" as used in the preceding paragraph is intended to mean a bead supporting structure which is rigid in the axial sense at least so as to ensure that the bead wires are held in accurately predetermined axially spaced relationship. To achieve this end the tube does not necessarily need to have a continuous internal surface although this has been found to be advantageous for resisting expansion of the carcass and to help to consolidate the carcass during the operation of turning the ends of the carcass around the bead wires. In some applications, therefore, the tube could take the form of spacer members such as rods which serve to hold a pair of bead-supporting rings or similar members in predetermined spaced relationship effectively to constitute a tube for the purpose defined above.

According to another aspect of the invention apparatus for manufacturing a pneumatic tyre comprises a bead tube at opposite ends of which tyre bead elements may be located in axially spaced relationship predetermined by the length of the tube, means for locating the bead tube in a predetermined axial position in coaxial relationship with an expansible former, the bead tube being constructed so as to be capable of supporting the bead elements in said axially spaced relationship during an operation to turn tyre carcass material radially outwardly around the bead elements and to be removable from a partially-built tyre carcass supported therein.

One embodiment of the invention will now be described, by way of example, with reference to the accompanying drawings, in which:

FIGS. 1 to 9 illustrate diagrammatically stages in the manufacture of a tyre carcass;

FIG. 10 is a diagrammatic axial cross-section of one form of bead tube;

FIG. 11 is a diagrammatic end view of the bead tube of FIG. 10, showing its closed position in full lines and its open position in dotted lines;

FIGS. 12-14 are diagrammatic scrap axial crosssectional views showing the action of an optional bead tube locking ring.

Figure 9:
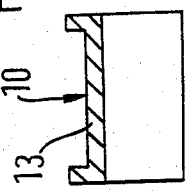

A bead tube 10 having flanged ends 11 and 12 is formed from three cylindrical segments 13,14, and 15 (see FIG. 11) which are supported in a suitable frame so as to be radially movable into the assembled state as shown in FIGS. 1 and 10 or to the "open" state as illustrated in FIG. 9 and in dotted lines in FIG. 11. The segments 13–15 are accurately guided so that they fit closely together in the assembled state, and suitable drive mechanisms are provided to effect simultaneous radial movement of the segments.

The steps of the method in accordance with the invention are illustrated in FIGS. 1 to 9. Bead wire assemblies 16,17 of generally conventional form each incorporating a wound wire bead 18 and a reinforced rubber apex strip 19 are applied to opposite ends of the bead tube 10. The bead tube 10 may be provided with magnetic means 20 or vacuum means 21, or both (as shown in FIG. 10), to hold the bead wire assemblies 16,17 in accurately coaxial and axially spaced relationship to one another and is arranged to be located in accurate coaxial relationship with an expansible tyre carcass building former 25 as shown in FIG. 3 so that the bead tube surrounds the former 25 and holds the bead assemblies in their required position relative to a partly-built tyre carcass 26, formed from a ply of rubberised parallel-cord fabric and a rubber liner, wound around the former 25 with the cords of the carcass ply running parallel to the axis of the former. The magnetic holding means 20 may comprise arcuate magnetic strips mounted around the inner edges of the segments to provide an annular magnetic holding device in the assembled state of the bead tube. The vacuum means 21 (see FIG. 10) may comprise galleries 27 in each segment connected through a pipe 28 to a source of vacuum and having orifices 29 distributed around the ends of each segment to apply suction to the bead assemblies.

The expansible tyre building former 25 may be of the slatted type having an expander mechanism of a kind which is well known in the art, and is surrounded by a rubber sleeve 32. As shown in FIG. 3, the former 25 is positioned within the bead tube so that the end portions 33,34 of the tyre carcass ply project on their respective sides of the bead assemblies 16,17 to enable them to be turned around the bead wire assemblies by expansion of the end portion of the former 25 as shown in FIGS. 5 and 6. For this purpose the former 25 is constructed in three sections so as to be expansible in its central region 35 as shown in FIG. 4 to press the carcass 26 against the inner surface of the assembled bead tube 10 whilst the end portions 37 and 38 of the former 25 are separately expansible as shown in FIG. 5 to turn up the projecting portions 33,34 of the carcass ply in a radial direction and to press them axially inwardly to consolidate them against the bead wire assemblies 16,17. The end portions 37,38 of the former 25 may comprise spring-loaded fingers and/or inflatable bags to produce the required contour to effect ply turn-up as illustrated in FIG. 5:

such arrangements are well known in the tyre building art.

Following the ply turn-up operation as shown in FIG. 5, the former 25 is contracted and removed from the bead tube leaving the partly-built tyre carcass in cylindrical ("flat-built") form, carried on the bead tube 10 as shown in FIG. 6. Vacuum may be applied through appropriate orifices and ducts to the curved inner surfaces of the bed tube segments to hold the carcass in position during this operation.

Figure 7:
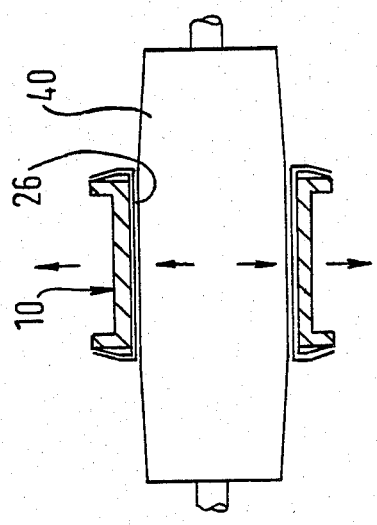
Figure 8:
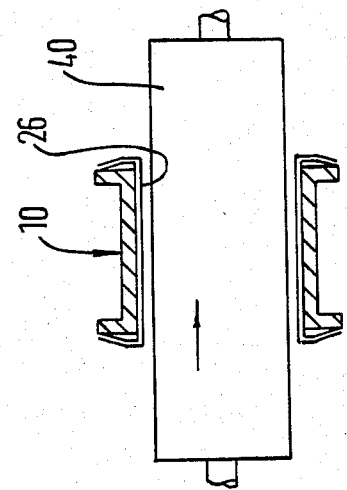

A shaping former 40 (see FIG. 7) is now inserted into a predetermined coaxial position within the bead tube 10 and its central portion is expanded as shown in FIG. 8 to grip the partly-built carcass 26. The shaping former 40 may be of conventional form, comprising means by which its central portion may be expanded whilst the portions immediately beneath the bead wires are drawn towards one another and the carcass is shaped into toroidal form, but before this operation may be undertaken it is necessary for the bead tube 10 to be removed. Removal of the bead tube 10 is effected by moving the segments 13–15 radially as shown in FIGS. 9 and 11 and withdrawing the former 40 axially from the open bead tube.

Consolidation of the bead wire assemblies and the addition of a breaker, tread and sidewalls may then be carried out by conventional operations to produce a finished tyre ready for moulding and vulcanising in the usual manner.

In order to ensure that the segments 13–15 of the bead tube are held firmly in an accurately predetermined relationship to provide a true cylinder in their assembled state, locking rings 45 as shown in FIGS. 12–14 may be employed, one at each end of the bead tube. The locking rings 45 which are internally tapered to move the segments into accurate concentricity are moved axially into position, at the stage shown in FIG. 1, to fit over the flanged ends 11 and 12 of the bead tube as shown in FIG. 14. The locking rings also act to prevent any disturbance of the segments 13–15 during the operations shown in FIGS. 1 to 8.

It will be noted that whilst in the use of conventional manufacturing processes and apparatus tyre carcasses are built on formers, and bead wire assemblies are then placed in position around them, in such existing apparatus the bead wire assemblies are not carried by supports which have the function of the bead tube described above. Thus the bead supports which have hitherto been used have normally been removed entirely before they ply turn-on operation and the flat-built carcass resulting from such an operation has lacked the very precise support and location of the bead wires afforded by the bead tube in the method described above. In effect the method in accordance with the invention holds the bead wires firmly during the ply turn-up operation on "anvils" provided by the ends of the bead tube.

In the method described above the carcass is shaped by the use of a separate shaping former. In an alternative method in accordance with the invention the expansible tyre building former may be constructed so as to be capable of also performing the shaping operation.

The apparatus described above enables pneumatic tyres to be manufactured with great precision, and is suitable for rapid automatic operation, enabling tyres to be produced more cheaply than with the use of conventional apparatus and methods. Particularly important features are:

1. The bead wire assemblies are automatically transported and positioned on the bead tube with great accuracy, and positively retained in their precise location. Any minor inaccuracy in the location of the bead wire assemblies is automatically corrected when the building former expands;
2. The bead tube establishes positively a predetermined ply cord length between the bead wires;
3. The bead tube provides a solid incompressible anvil to enable the ply turn-up to be consolidated against the bead apex.

I claim:

1. A method of manufacturing a partially-built carcass for a pneumatic tyre comprising locating a pair of tyre bead elements coaxially at opposite ends of a bead tube in axially spaced relationship predetermined by the length of the tube, locating within the tube an expansible former around which tyre carcass material is wrapped so that the material extends axially within the tube and the bead elements and projects axially beyond the bead elements at each end, expanding the carcass material to engage the bead elements and turning the projecting ends of the material radially outwardly around the bead elements whilst the bead elements are supported by the tube.

2. A method according to claim 1 wherein the carcass material within the bead tube is expanded, by expansion of the former, into contact with the interior of the bead tube.

3. A method according to claim 2 wherein the expansion of the former serves to transfer the carcass material from the expansible former to the bead tube.

4. A method according to claim 3 wherein after transferring the partially-built carcass to the bead tube the expansible former is contracted and removed axially therefrom and a shaping former is located in a predetermined axial position within the bead tube and is expanded to grip the bead elements, the bead tube is then removed and the partially-built carcass is shaped by expansion of the shaping former.

5. Apparatus for manufacturing a pneumatic tyre comprising a bead tube at opposite ends of which tyre bead elements may be located in axially spaced relationship predetermined by the length of the tube, and means for locating the bead tube in a predetermined axial position in coaxial relationship with an expansible former, the bead tube being constructed so as to be capable of supporting the bead elements in said axially spaced relationship during an operation to turn tyre carcass material radially outwardly around the bead elements and to be removable from a partially-built tyre carcass supported therein.

6. Apparatus according to claim 5 wherein the bead tube is formed from a plurality of cylindrical segments which are guided for radial movement so as to fit closely together in the assembled state of the tube and to be radially movable outwardly to permit the removal of a partially-built tyre carcass therefrom.

7. Apparatus according to claim 6 wherein the segments are formed with flanged ends.

8. Apparatus according to claim 6 wherein the segments are arranged to be held together in the assembled state by means of a pair of locking rings arranged to fit one over each end of the assembled tube.

9. Apparatus according to claim 5 wherein the bead tube is provided with magnetic means to assist in the retention of bead wire assemblies on the ends of the tube.

10. Apparatus according to claim 5 wherein vacuum means is provided to assist in the retention of bead wire assemblies on the ends of the tube.

11. Apparatus according to claim 5 wherein vacuum means is provided to assist in the retention of tyre carcass material on the inner surface of the bead tube.

12. Apparatus according to claim 5 wherein the expansible former comprises means at each end for turning up tyre carcass material radially outwardly around the bead elements.

* * * * *